US010118663B2

(12) United States Patent
Wada et al.

(10) Patent No.: US 10,118,663 B2
(45) Date of Patent: Nov. 6, 2018

(54) HANDLEBAR MOUNT STRUCTURE FOR SADDLED VEHICLE

(71) Applicant: Kawasaki Jukogyo Kabushiki Kaisha, Kobe-shi, Hyogo (JP)

(72) Inventors: Hiroyuki Wada, Kobe (JP); Masato Kinoshita, Kakogawa (JP)

(73) Assignee: KAWASAKI JUKOGYO KABUSHIKI KAISHA, Kobe-Shi, Hyogo (JP)

(*) Notice: Subject to any disclaimer, the term of this patent is extended or adjusted under 35 U.S.C. 154(b) by 90 days.

(21) Appl. No.: 15/235,640

(22) Filed: Aug. 12, 2016

(65) Prior Publication Data

US 2016/0347399 A1 Dec. 1, 2016

Related U.S. Application Data

(63) Continuation of application No. PCT/JP2015/053052, filed on Feb. 4, 2015.

(30) Foreign Application Priority Data

Mar. 19, 2014 (JP) .................................. 2014-056087

(51) Int. Cl.
*B62K 21/20* (2006.01)
*B62K 21/12* (2006.01)

(52) U.S. Cl.
CPC .............. *B62K 21/20* (2013.01); *B62K 21/12* (2013.01); *B62K 2201/02* (2013.01)

(58) Field of Classification Search
CPC ..... B62K 21/20; B62K 21/12; B62K 2201/02
See application file for complete search history.

(56) References Cited

U.S. PATENT DOCUMENTS 6,712,541 B1* 3/2004 Henricksen ............ B62K 21/04
403/286
6,953,201 B1* 10/2005 VanDeMortel ........ B62K 21/14
280/276

(Continued)

FOREIGN PATENT DOCUMENTS

JP 58-002186 6/1956
JP 58-002186 6/1983

(Continued)

OTHER PUBLICATIONS

Extended and Supplementary Search Report dated Oct. 19, 2017 for Corresponding European Patent Application No. 15765301.5 (10 pages).

(Continued)

*Primary Examiner* — Vicky A Johnson

(57) ABSTRACT

A handlebar is supported by an upper bracket of a motorcycle through a handlebar holder. The handlebar holder includes a lower end portion supported by the upper bracket and an upper end portion to support the handlebar. A holder shank is provided in a lower end of the handlebar holder, and has a tip end portion formed with a male thread. A holder shank throughhole is formed in the upper bracket, through which throughhole the holder shank extends. The holder shank throughhole accommodates therein a tubular elastic mount member for suppressing transmission of vibrations. The holder shank is passed through a holder shank insertion hole formed on an inner side of the elastic mount member, and an elastic member is interposed forwardly and rearwardly of the elastic mount member situated between the handlebar holder and the upper bracket.

6 Claims, 5 Drawing Sheets

(56) References Cited

U.S. PATENT DOCUMENTS

| | | | |
|---|---|---|---|
| 8,353,227 B2 | 1/2013 | Hayashi et al. | |
| 2005/0066766 A1 | 3/2005 | Truchinski | |
| 2008/0296077 A1* | 12/2008 | Miyamoto | B62K 21/02 |
| | | | 180/219 |
| 2011/0120257 A1* | 5/2011 | Hayashi | B62K 21/14 |
| | | | 74/551.1 |

FOREIGN PATENT DOCUMENTS

| | | |
|---|---|---|
| JP | 64-042996 | 3/1989 |
| JP | 02-169382 | 6/1990 |
| JP | 02-120297 | 9/1990 |
| JP | 2002-029477 | 1/2002 |
| JP | 2011-105276 | 6/2011 |

OTHER PUBLICATIONS

International Search Report with English Language Translation for PCT/JP2015/053052, filed Feb. 4, 2015 (4 pages).
International Preliminary Report on Patentability in PCT/JP2015/053052; dated Sep. 29, 2016; 7 pages.
Notification of Reason(s) for Rejection dated Aug. 22, 2017 for Corresponding Japanese Patent Application No. 2014-056087 with English Language Translation (5 pages).

* cited by examiner

000

HANDLEBAR MOUNT STRUCTURE FOR SADDLED VEHICLE

CROSS REFERENCE TO THE RELATED APPLICATION

This application is a continuation application, under 35 U.S.C § 111(a) of international patent application No. PCT/JP2015/053052, filed Feb. 4, 2015, which claims priority to Japanese patent application No. 2014-056087, filed Mar. 19, 2014, the entire disclosure of which is herein incorporated by reference as a part of this application.

BACKGROUND OF THE INVENTION

Field of the Invention

The present invention relates to a handlebar mount structure for a saddle-riding vehicle such as, for example, a motorcycle in which a steering handlebar is mounted on an upper bracket supported pivotally by a vehicle frame.

Description of Related Art

The steering handlebar used in motorcycles is generally supported by an upper bracket that is rotatably supported in a vehicle frame structure. See, for example, the patent document 1 listed below. According to this patent document 1, the handlebar is fixed to the upper bracket by means of bolts.

PRIOR ART LITERATURE

Patent Document 1: JP Laid-open Utility Model Publication No. S58-002186

However, in the handlebar mount structure disclosed in the above mentioned patent document 1, it has been found that vibrations induced by a combustion engine mounted on the vehicle frame structure are often transmitted to the hands of a vehicle driver. If in order to suppress this occurrence a rubber mount is employed to support the handlebar, it may occur that due to the elasticity of rubber used to form the rubber mount the handlebar may be shaken in a longitudinal direction and/or a vehicle widthwise direction.

SUMMARY OF THE INVENTION

In view of the foregoing, the present invention has been devised to provide a handlebar mount structure capable of suppressing the shaking motion of the handlebar while transmission of the vibration occurring in the vehicle to the handlebar is suppressed.

In order to accomplish the foregoing object of the present invention, the present invention provides a handlebar mount structure for supporting a steering handlebar on an upper bracket that is rotatably supported by a vehicle frame of a saddled type automotive vehicle. The handlebar mount structure includes: a handlebar holder having a lower end portion supported by the upper bracket and also having an upper end portion clamping the handlebar; a holder shank is provided in a lower end of the handlebar holder, the holder shank having a tip end portion formed therein with a male thread; a holder shank throughhole being defined in the upper bracket for passage of the holder shank therethrough; a tubular elastic mount member inserted in the holder shank throughhole to suppress transmission of vibrations between the upper bracket and the handlebar holder, and the holder shank referred to above being inserted in a holder shank insertion hole that is defined in an inner side of the elastic mount member; and an elastic member is interposed for- wardly and rearwardly of the elastic mount member situated between the handlebar holder and the upper bracket.

According to the construction described hereinabove, since the handlebar holder is supported by the upper bracket through the rubber mount member, the handlebar mount structure assumes a vibration isolating structure. Accordingly, transmission of the vibrations, induced in the vehicle body, to the handlebar can be suppressed. The use of the elastic mount member may appear to possibly result in tottering of the handlebar holder about a horizontal axis extending in the vehicle widthwise direction, but the interposition of the elastic member forwardly and rearwardly of the elastic rubber mount members is effective to suppress such a tottering of the handlebar.

In a preferred embodiment of the present invention, the handlebar mount structure of the present invention may also include a rubber washer mounted on an outer periphery of the elastic mount member and disposed between the handlebar holder and the upper bracket. According to this construction, by the cumulative effect of the elastic members and the rubber washers, the tottering of the handlebar can be further suppressed.

In another preferred embodiment of the present invention, the elastic member and the rubber washer are preferably formed integrally with each other. According to this construction, by mounting the elastic mount member on the vehicle body, the elastic member can also be fitted to the vehicle body at the same time, and, therefore, the assemblability of the handlebar onto the vehicle body can be increased.

In a further preferred embodiment of the present invention, the elastic member may have a projection defined therein so as to extend upwardly or downwardly, and this projection is engaged in a recess formed in the handlebar holder or the upper bracket. According to this construction, the elastic member can be positioned relative to the handlebar holder when the projection is inserted in the recess. Therefore, the assemblability of the handlebar onto the vehicle body can be increased.

In a still preferred embodiment of the present invention, the elastic mount member also preferably includes: an inner tube having the holder shank insertion hole defined in an interior thereof; an outer tube having an outer peripheral surface held in contact with the holder shank throughhole; and a tubular elastic body interposed between the inner tube and the outer tube. According to this construction, the holder shank contacts with the inner tube, and the outer tube contacts with the upper bracket. Therefore, insertion of the holder shank into the corresponding holder shank insertion hole defined in the elastic mount member and insertion of the elastic mount members into the associated holder shank throughhole in the upper bracket can be facilitated.

In a yet further preferred embodiment of the present invention, particularly where the elastic mount member referred to above includes the inner tube and the outer tube, the holder shank is press fitted into the handlebar holder so as to protrude downwardly of the handlebar holder, which holder shank has a lower end portion formed with the male thread, and the inner tube of the elastic mount member is sandwiched between a nut, threadingly engaged with the male thread, and an undersurface of the handlebar holder. According to this construction, the position of the elastic mount member is stabilized.

In a still further preferred embodiment of the present invention, the holder shank is provided in one pair on left and right sides. According to this construction, fitting of the handlebar holder onto the upper bracket is stabilized.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

Figure 1:
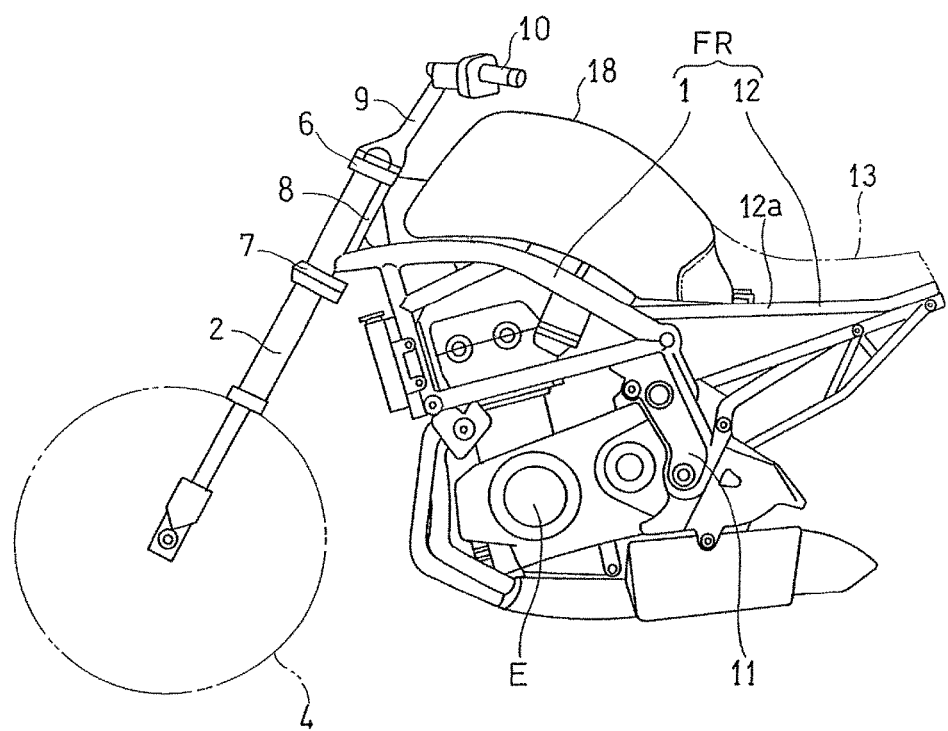
FIG. 1 is a fragmentary side view showing a front portion of a motorcycle equipped with a handlebar mount structure designed in accordance with a preferred embodiment of the present invention.
Figure 2:
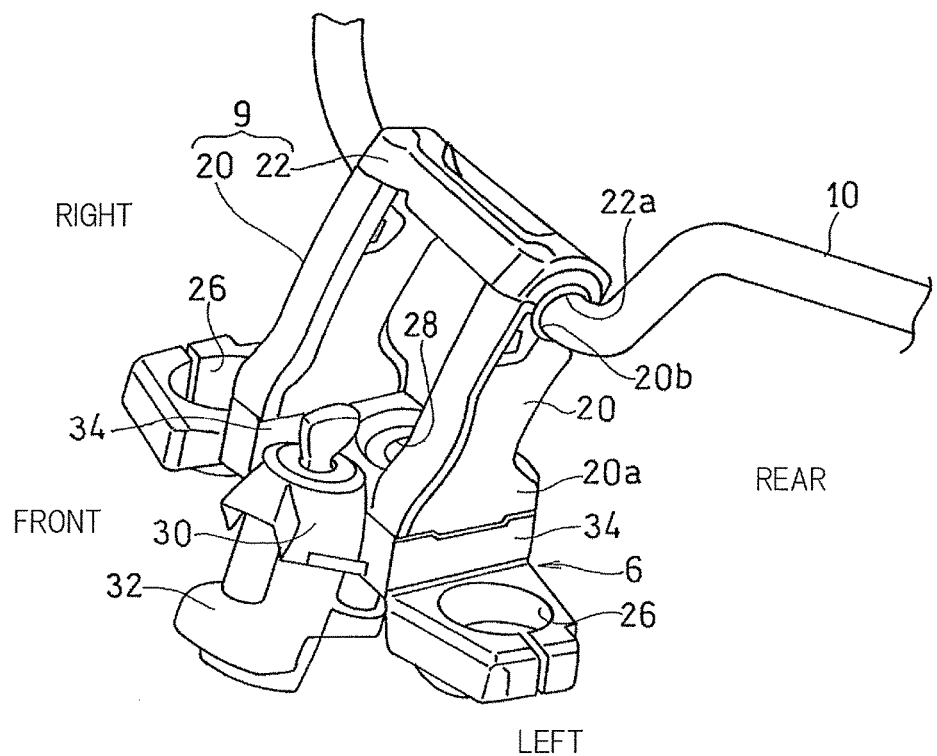
FIG. 2 is a fragmentary forward perspective view showing the handlebar mount structure.

In the description that follows, a preferred embodiment of the present will be set forth in detail with particular reference to the accompanying drawings. In describing the present invention, however, the terms "left" and "front", or similar notations, that are hereinabove and hereinafter used are to be understood as meaning relative terms descriptive of positions and/or directions as viewed from a vehicle rider occupying the seat. Referring particularly to FIGS. 1 and 2, the motorcycle to which the present invention is applied includes a main frame 1 forming a front half unit of a vehicle frame structure FR, and a front fork 2 supporting a front wheel 4 at a lower end portion thereof is supported by a front end of the main frame 1. The front fork 2 referred to above, together with an upper bracket 6 and a lower bracket 7 both supporting the front fork 2, is pivotally supported by a head pipe 8 at the front end of the main frame 1 through a steering shaft (not shown). A handlebar 10 is fitted to the upper bracket 6 through a handlebar holder 9.

On the other hand, the main frame 1 has a rear end lower portion to which a swingarm bracket 11 is secured, and a swingarm for supporting a rear wheel (not shown) is pivotally supported by the swingarm bracket 11. The main frame 1 also has an intermediate lower portion on which a combustion engine E for driving the rear wheel is mounted.

A rear portion of the main frame 1 is connected with a rear frame 12 forming a rear half portion of the vehicle frame structure FR. A rider's seat 13 and a fellow passenger's seat (not shown) rearwardly thereof are supported by a seat rail 12a forming an upper portion of the rear frame 12. A fuel tank 18 is disposed between the head pipe 8 and the rider's seat 13, and is supported by an upper portion of the main frame 1, that is, a vehicle upper portion.

As shown in FIG. 2, the handle holder 9 has a lower end portion supported by the upper bracket 6 and has an upper end portion used to clamp the handlebar 10. Specifically, the handle holder 9 includes a pair of left and right lower handlebar holders 20 and a single upper handlebar holder 22, each of the lower handlebar holders 20 extends upwardly from a corresponding fitting portion 20a at a lower end thereof, whereas an upper end of the respective lower handlebar holder 20 has a lower handlebar support portion 20b of a semicircular shape defined therein. The upper handlebar holder 22 has opposite, left and right end portions provided with respective upper handlebar support portions 22a of a semicircular shape, which upper handlebar support portions 22a cooperate respectively with lower handlebar support portions 20b to support the handlebar 10.

In a condition with the handlebar 10 clamped by and between the upper and lower handlebar support portions 22a and 20b, the lower handlebar holder 20 and the upper handlebar holder 22 are connected with each other by means of bolts 24 (best shown in FIG. 5), to thereby allow the handlebar holder 9 to support the handlebar 10.

Figure 3:
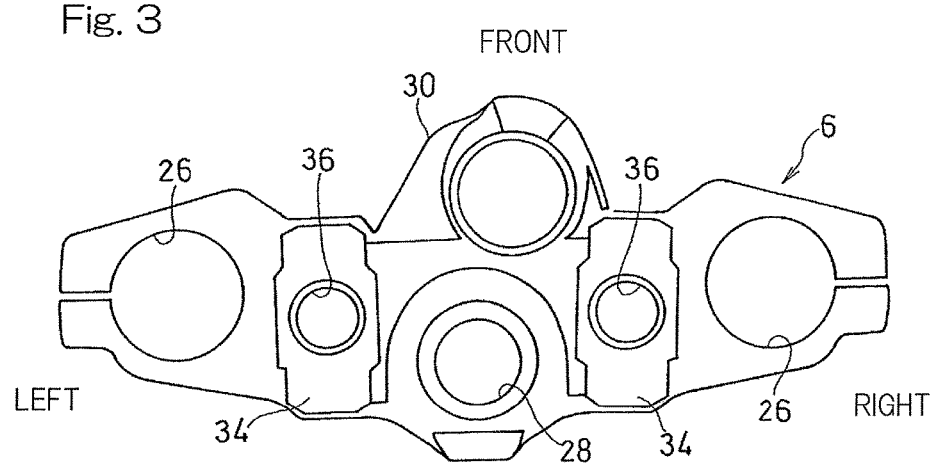
FIG. 3 is a top plan view showing, on an enlarged scale, an upper bracket used in a motorcycle.

As shown in FIG. 3, the upper bracket 6 is of a generally rectangular member having its lengthwise direction lying in a leftward and rightward direction or vehicle widthwise direction, and fork insertion boles 26 for receiving the front fork 2 (shown in FIG. 1) are formed in opposite side end portions of the upper bracket 6. An intermediate portion of the upper bracket 6 with respect to the vehicle widthwise direction is formed with a shaft insertion hole 28 through which the previously mentioned steering shaft (not shown) is inserted. A cylinder mounting portion 30 is formed in the intermediate portion of the upper bracket 6 with respect to a forward and rearward direction or longitudinal direction of the motorcycle so as to swell forwardly, and a key cylinder 32 shown in FIG. 2 is supported in this cylinder mounting portion 30.

A pair of left and right holder support portions 34 are formed between left and right fork insertion holes 26, respectively, and the shaft insertion hole 28 in the upper bracket 6, so as to protrude upwardly. The holder support portions 34 are of a structure as will be detailed later and are used to support the handlebar holder 9. As shown in FIG. 3, a holder shank throughhole 36, which is in the form of a throughhole oriented in an upward and downward direction or vertical direction, is formed in each of the holder supports 34.

Figure 4:
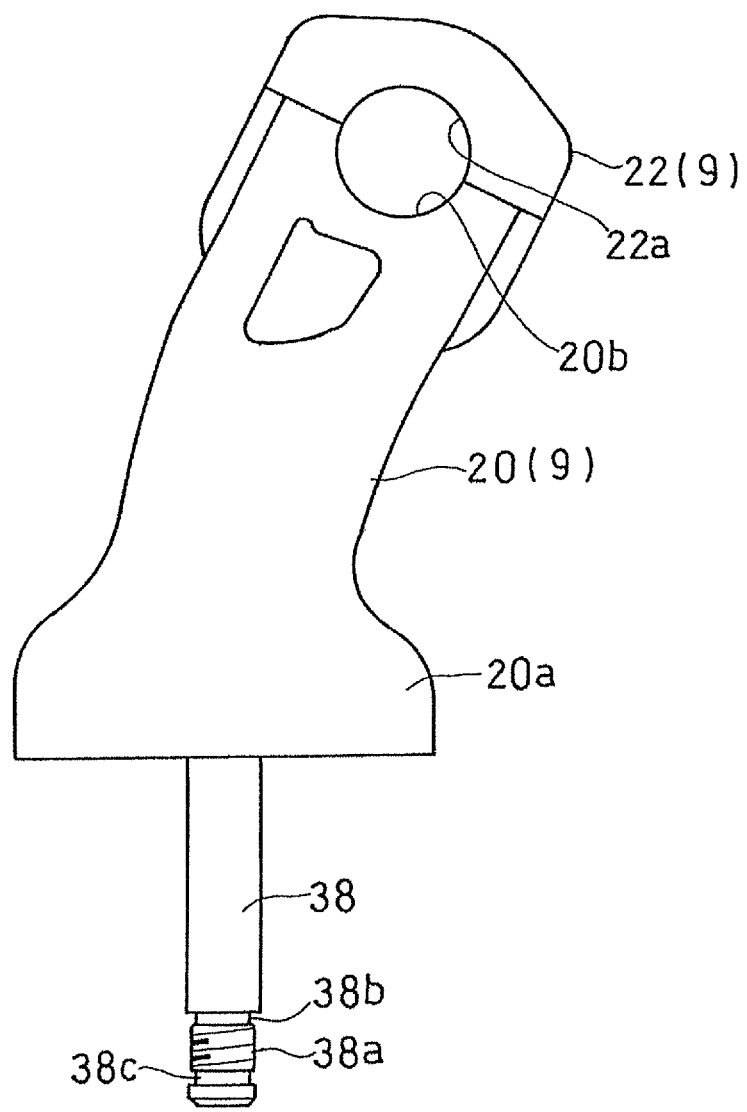
FIG. 4 is a schematic side view showing, on an enlarged scale, a handlebar holder used in the motorcycle.

FIG. 4 illustrates a side view showing the handlebar holder 9 on a left side. As shown in FIG. 4, the handlebar holder 9 has a lower end into which a holder shank 38 is press fitted so as to extend in a direction downwardly from the handle holder 9. A tip end portion of the holder shank 38 has a helical male thread 38a defined therein. Upper and lower portions of the helical male thread 38a in the holder shank 38 are formed with first and second grooves 38b and 38c, respectively, each being in the form of an annular groove.

Figure 5:
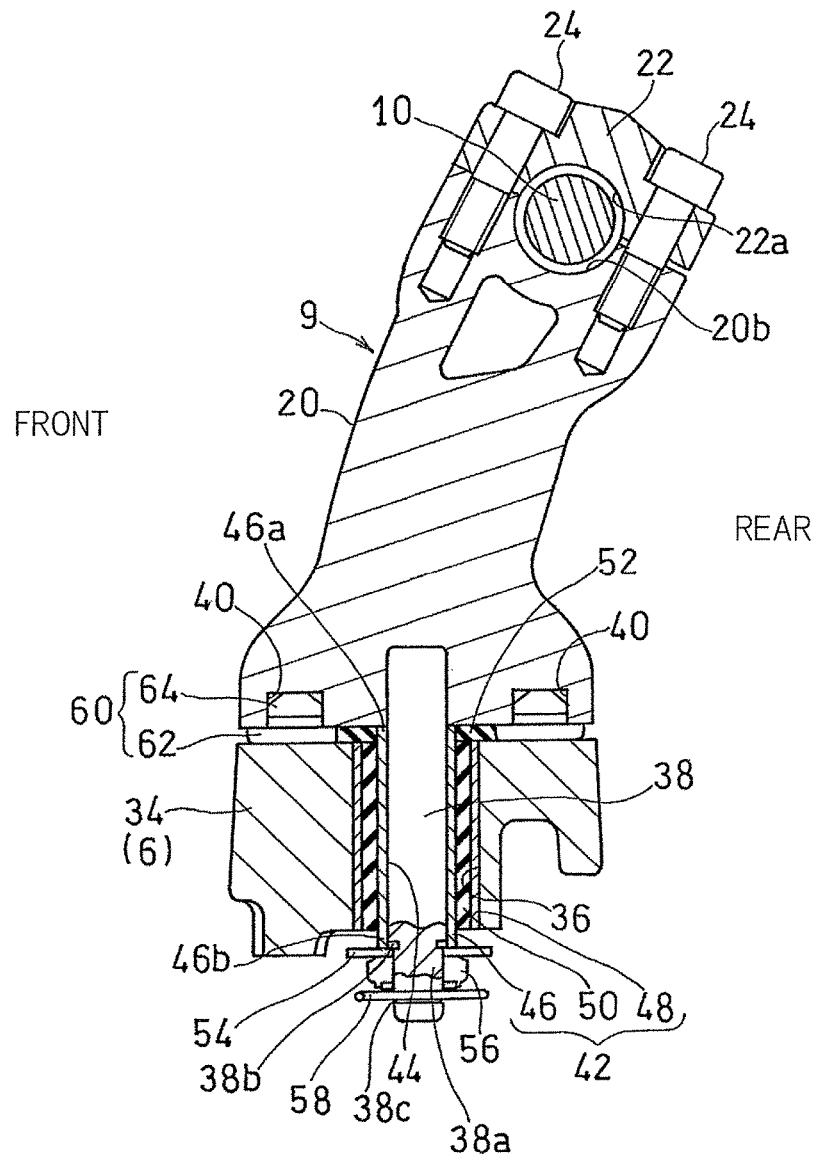
FIG. 5 is a sectional view showing a mounting region between the upper bracket and the handlebar holder.

As shown in FIG. 5, the handlebar holder 9 has an undersurface formed with recesses 40 each depressed upwardly inwardly of the handlebar holder 9. Those recesses 40 are provided at two respective locations spaced in the forward and rearward direction on respective sides of the holder shank 38. A tubular elastic mount member 42 is press fitted into the holder shank throughhole 36 in the upper bracket 6. Accordingly, the elastic mount member 42 is fixed to the upper bracket 6. The elastic mount member 42 suppresses transmission of vibrations between the upper bracket 6 and the handlebar holder 9.

Figure 6:
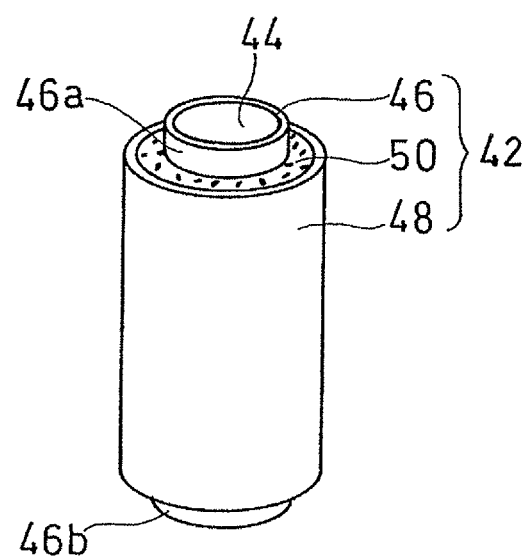
FIG. 6 is a perspective view showing, on an enlarged scale, an elastic mount member for use in the motorcycle.

More specifically, as shown in FIG. 6, the elastic mount member 42 includes an inner tube 46 formed with a holder shank insertion hole 44 for receiving the holder shank 38 (best shown in FIG. 5), an outer tube 48 having its outer peripheral face engageable with the holder shank throughhole 36, and a tubular elastic body 50 such as, for example, rubber interposed between the inner tube 46 and the outer tube 48. As shown in FIG. 5, the inner tube 46 is in the form of a cylindrical tube elongated in the vertical direction, having a length greater than that of any of the outer tube 48 and the elastic body 50. As such the inner tube 46 includes an inner tube upper end portion 46a configured to protrude upwardly from the outer tube 48 and the elastic body 50, and an inner tube lower end portion 46b configured to protrude downwardly from the outer tube 48 and the elastic body 50.

The inner tube upper end portion 46a has an end face held in contact with the undersurface of the handlebar holder 9, and a rubber washer 52 is mounted on an outer periphery of the inner tube upper end portion 46a. In other words, the rubber washer 52 is interposed between the handlebar holder 9 and the upper bracket 6. On the other hand, the inner tube lower end portion 46b has an end face held in contact with an upper face of a washer 54 disposed on an outer periphery of the first groove 38b in the holder shank 38. The washer 54 has an undersurface held in contact with a nut 56 threaded to the helical male thread 38a. A circlip 58 is engaged in the second groove 38c in the holder shank 38 to avoid separation of the nut 56 from the helical male thread 38a.

Figure 7:
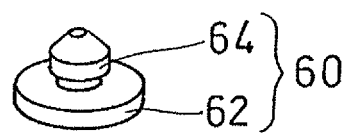
FIG. 7 is a perspective view showing an elastic member used in the motorcycle.

An elastic member 60 is interposed between forwardly and rearwardly of the elastic mount member 42 and the rubber washer 52 between the handlebar holder 9 and the upper bracket 9. The elastic member 60 is, as shown in FIG. 7, made up of a main body portion 62 and a projection 64 protruding upwardly from the main body portion 62. As shown in FIG. 5, the main body portion 62 is disposed between the handlebar holder 9 and the upper bracket 6, and the projection 64 is engaged in the respective recess 40 defined in the handlebar holder 9.

In the description that follows, procedures of fitting the handlebar 10 to the upper bracket 6 will be described. At the outset, the elastic mount member 42 is press fitted into each of the holder shank throughhole 36 in the upper bracket 6. The rubber washer 52 is subsequently mounted on the outer periphery of the inner tube upper end portion 46a of each of the elastic mount members 42, and the projection 64 of the elastic member 60 is inserted into each of the recesses 40 in the lower handlebar holder 20. In this condition, the holder shank 38 in each of the lower handlebar holders 20 is inserted into the holder shank insertion hole 44 in the corresponding elastic mount member 42.

Also, the washer 54 is engaged in the first groove 38b in each of the holder shanks 38, and thereafter, the nut 56 is fastened onto the male thread 38a in each of the holder shanks 38. A fastening force of the nut 56 is transmitted to the inner tube 46 of the elastic mount member 42 through the washer 54. By so doing, the inner tube 46 is clamped between the undersurface of the handlebar holder 9 and the nut 56 and, accordingly, each of the lower handlebar holders 20 is supported by the upper bracket 6. The circlip 58 for preventing the separation of the corresponding nut 56 is then engaged in the second groove 38c in the respective holder shank 38.

Thereafter, in a condition in which the handlebar 10 is engaged with the lower handlebar support portions 20b in the lower handlebar holder 20 and the upper handlebar support portions 22a in the upper handlebar holder 22, the lower handlebar holders 20 and the upper handlebar holder 22 are connected together by means of the bolts 24. Thereby, the handlebar 10 is clamped between the lower handlebar holders 20 and the upper handlebar holder 22, wherefore the handlebar 10 is supported by the upper bracket 6 through the handlebar holder 9.

According to the construction hereinabove described, since the handlebar holder 9 is supported by the upper bracket 6 through the rubber mount members 42, the handlebar mount structure assumes a vibration isolating structure. Accordingly, transmission of vibrations occurring in the vehicle body to the handlebar 10 can be suppressed. The use of the elastic mount members 42 may appear to possibly result in tottering of the handlebar holder 9 about a horizontal axis extending in the vehicle widthwise direction, but the disposition of the elastic members 60 forwardly and rearwardly of the elastic rubber mount members 42 is effective to suppress the tottering of the handlebar 10.

Also, the rubber washer 52 is mounted on the outer periphery of the inner tube upper end portion 46a of each of the elastic mount member 42, and this rubber washer 52 is interposed between the handlebar holder 9 and the upper bracket 6. Accordingly, by the cumulative effect of the elastic members 60 and the rubber washers 52, the tottering of the handlebar 10 can be further suppressed.

Yet, since the projection 64 protruding upwardly from the elastic member 60 is engaged in each of the recesses 40 defined in the handlebar holder 9, each of the elastic members 60 is positioned relative to the handlebar holder 9 and, hence, the assemblability of the handlebar 10 onto the vehicle body can be increased.

Furthermore, the holder shank 38 is brought into contact with the inner periphery of the inner tube 46 of each of the elastic mount members 42, and the outer periphery of the outer tube 48 is brought into contact with the upper bracket 6. Accordingly, insertion of the holder shank 38 into the corresponding holder shank insertion hole 44 defined in each of the elastic mount members 42 and insertion of each of the elastic mount members 42 into the associated holder shank throughhole 36 in the upper bracket 6 can be facilitated.

Although in the practice of the foregoing embodiment of the present invention, the elastic member 60 and the rubber washer 52 have been shown and described as members separate from each other, the elastic member 60 and the rubber washer 52 may be formed integrally with each other. In such case, by mounting the elastic mount member 42 on the vehicle body, the elastic member 60 can also be fitted to the vehicle body at the same time. Therefore, the assemblability of the handlebar 10 onto the vehicle body can also be increased.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. By way of example, the structure of each of the elastic mount members 42 may not necessarily be limited to that shown and described. Also, the use of the rubber washer 52 may not be essential and may therefore be dispensed with. In addition, each of the recesses 40 may be formed in the upper bracket 6. In such case, the projection 64 protrudes downwardly. Also, the use of the recesses 40 and the projections 64 may not be essential and may therefore be dispensed with. The handlebar mount structure of the present invention may be equally applied to any saddle-riding vehicles other than the motorcycle.

Accordingly, such changes and modifications are, unless they depart from the scope of the present invention as delivered from the claims annexed hereto, to be construed as included therein.

What is claimed is:

1. A saddle riding vehicle comprising:
a steering handlebar;
a vehicle frame structure;
an upper bracket that is rotatably supported by the vehicle frame structure; and
a handlebar mount structure to support the steering handlebar on the upper bracket, in which the handlebar mount structure comprises:
a handlebar holder having a lower end portion supported by the upper bracket and also having an upper end portion clamping the handlebar, a holder shank being provided in a lower end of the handlebar holder, the holder shank having a tip end portion formed therein with a male thread;
a holder shank throughhole defined in the upper bracket, through which the holder shank is inserted;
a tubular elastic mount member is inserted in the holder shank throughhole to suppress transmission of vibrations between the upper bracket and the handlebar holder, the holder shank being inserted in a holder shank insertion hole that is defined in an inner side of the elastic mount member;
elastic members interposed forwardly and rearwardly of the tubular elastic mount member at a location between the handlebar holder and the upper bracket;
a rubber washer mounted on an outer periphery of the elastic mount member and disposed between the handlebar holder and the upper bracket, wherein
each of the elastic members has a projection defined therein so as to extend upwardly or downwardly, and
the projections are engaged in recesses formed in the handlebar holder.

2. The saddle-riding vehicle as claimed in claim 1, in which the elastic mount member includes:
an inner tube having the holder shank insertion hole defined in an interior thereof;
an outer tube having an outer peripheral surface held in contact with the holder shank throughhole; and
a tubular elastic body interposed between the inner tube and the outer tube.

3. The saddle-riding vehicle as claimed in claim 2, in which the holder shank is press fitted into the handlebar holder so as to protrude downwardly of the handlebar holder,
the holder shank has a lower end portion formed with the male thread, and
the inner tube of the elastic mount member is sandwiched between a nut, threadingly engaged with the male thread, and an undersurface of the handlebar holder.

4. The saddle-riding vehicle as claimed in claim 1, in which the holder shank is provided in one pair on left and right sides.

5. The saddle-riding vehicle as claimed in claim 1, wherein the upper bracket includes a cylinder mounting portion formed to extend outward from the upper bracket and forward from the shaft insertion hole to support a key cylinder in the cylinder mounting portion.

6. The saddle-riding vehicle as claimed in claim 1, wherein a bottom surface of the handlebar holder has a pair of recesses with a first recess position at a forward side of the tubular elastic mount member and a second recess position at a rearwardly side of the tubular elastic mount member, further comprising:
each of the elastic members have a main body positioned below the recess and contacting an upper surface of the upper bracket with a projection protruding upward from the main body to extend into and engage a respective recess to suppress any tottering of the handlebar.

* * * * *